United States Patent [19]

Abe et al.

[11] 4,041,922

[45] Aug. 16, 1977

[54] SYSTEM AND DEVICE FOR THE IGNITION OF AN INTERNAL COMBUSTION ENGINE USING A LEAN AIR-FUEL MIXTURE

[75] Inventors: Michio Abe, Kasugai Aichi; Naoyuki Maeda, Inyuama, both of Japan

[73] Assignee: Tokai TRW & Co. Ltd., Kasugai Aichi, Japan

[21] Appl. No.: 591,452

[22] Filed: June 30, 1975

[30] Foreign Application Priority Data

July 8, 1974  Japan .................. 49-078008

[51] Int. Cl.² .................. F02B 23/00; F02P 1/00
[52] U.S. Cl. .................. 123/191 S; 123/32 SP; 123/143 B; 123/148 A; 123/148 E; 123/169 R; 123/169 MG; 313/231
[58] Field of Search .......... 123/191 S, 191 SP, 119 E, 123/32 C, 32 SP, 325 A, 325 T, DIG. 4, 37, 143 R, 143 B, 169 R, 169 MG, 148 E, 148 AC, 148 R, 148 A; 313/128, 140, 141, 143, 139, 231

[56] References Cited

U.S. PATENT DOCUMENTS

| | | | |
|---|---|---|---|
| 2,093,339 | 9/1937 | Pippig | 123/32 SP |
| 2,866,447 | 12/1958 | Kaehni | 123/148 AC |
| 2,866,839 | 12/1958 | Kaehni | 123/148 E |
| 3,019,276 | 1/1962 | Harlow | 123/148 A |
| 3,149,620 | 9/1964 | Cataldo | 123/148 E |
| 3,613,653 | 10/1971 | Irvin et al. | 123/148 A |
| 3,776,212 | 12/1973 | Karlowitz | 123/32 C X |
| 3,842,818 | 10/1974 | Cowell et al. | 123/169 R X |
| 3,842,819 | 10/1974 | Atkins | 123/169 R X |
| 3,921,605 | 11/1975 | Wyczalek | 123/169 R X |

Primary Examiner—C. J. Husar
Assistant Examiner—Craig R. Feinberg

[57] ABSTRACT

An improved engine for burning a lean air-fuel mixture includes a main combustion chamber into which the air-fuel mixture is introduced and an auxiliary combustion chamber wherein the air-fuel mixture is initially ignited. A spark plug in the auxiliary combustion chamber has central and side electrodes which define a spark gap. A corona discharge is established in an electrostatic field between the central electrode and a field electrode. The ions in the corona discharge collect on fuel particles in the air-fuel mixture so that these particles are electrically charged and deposited on the field electrode, the walls of the auxiliary combustion chamber, and the side electrode. The fuel particles which come toward the central electrode are electrostatically atomized by the corona discharge and accelerated away. As this is occurring, the electrically charged air-fuel mixture accelerates away from the entrance to the auxiliary combustion chamber with a resulting increase in flow rate and turbulence in the auxiliary combustion chamber. Upon establishment of an electrical arc across the spark gap, the rich air-fuel mixture in the auxiliary combustion chamber is ignited and the resultant flame is directed by the entrance passageway or nozzle into the main chamber in such a manner as to insure ignition and complete burning of the relatively lean mixture in the main chamber during a comparatively longer while.

17 Claims, 10 Drawing Figures

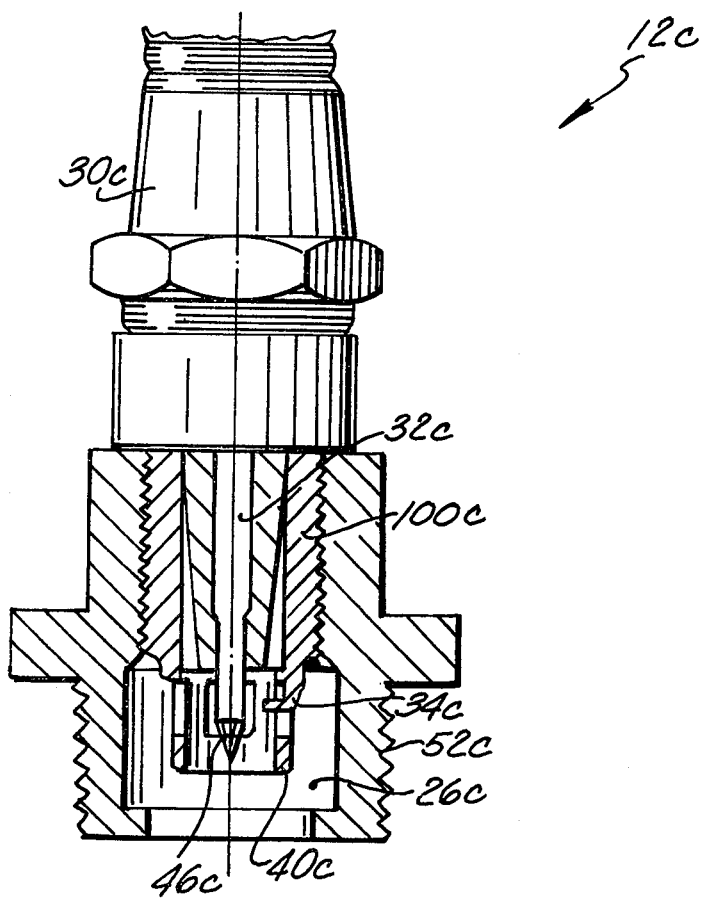
FIG. 7
FIG. 8
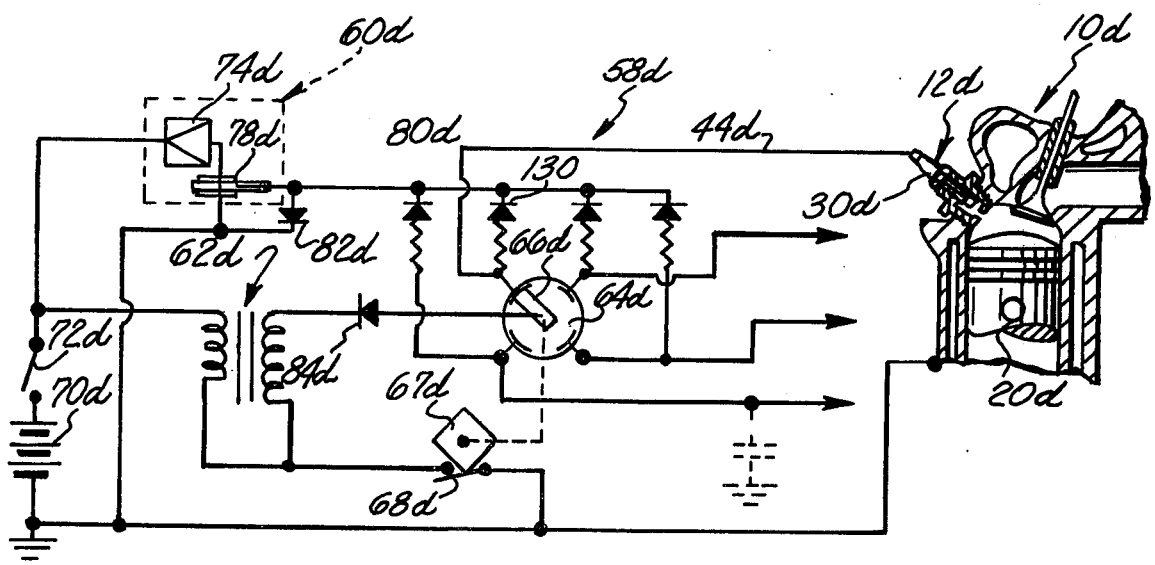

SYSTEM AND DEVICE FOR THE IGNITION OF AN INTERNAL COMBUSTION ENGINE USING A LEAN AIR-FUEL MIXTURE

BACKGROUND OF THE INVENTION

The present invention relates to a new and improved engine and more specifically to an internal combustion engine in which a relatively lean air-fuel mixture in a main combustion chamber is ignited by initially igniting a relatively rich air-fuel mixture in an auxiliary combustion chamber.

A known internal combustion engine includes a main combustion chamber into which a relatively lean air-fuel mixture is introduced through a first conduit and valve. A relatively rich air-fuel mixture is introduced into an auxiliary combustion chamber through a second conduit and valve. The rich air-fuel mixture in the auxiliary combustion chamber is ignited by a spark plug. The resulting flame is directed into the main combustion chamber to effect ignition of the lean air-fuel mixture therein. An engine having this construction requires two air-fuel conduits and flow control valves for the different air-fuel mixtures.

Another known engine is disclosed in U.S. Pat. No. 2,093,339 and injects fuel only into an auxiliary chamber. During a compression stroke, a spark plug in the auxiliary chamber is energized with a voltage which is insufficient to cause sparking.

Still another known engine is disclosed in U.S. Pat. No. 3,776,212. The engine disclosed in this patent includes a main combustion chamber from which an air-fuel mixture is forced through a nozzle into an auxiliary combustion chamber during a compression stroke of the engine. The fuel in the auxiliary combustion chamber is ignited by a spark plug and the flame is directed into the main combustion chamber to ignite the air-fuel mixture therein. Since the air-fuel mixture in this known engine is forced from the main combustion chamber into the auxiliary combustion chamber, the gases in the auxiliary combustion chamber will have the same air-to-fuel ratio as the gases in the main combustion chamber.

In an effort to improve engine operating efficiency and to enable lean air-fuel mixtures to be utilized, it has been suggested that an electrostatic field by utilized to accumulate fuel droplets adjacent to a spark plug in the manner disclosed in U. S. Pat. No. 3,318,293. Various other arrangements for establishing electrostatic fields are disclosed in Australian Pat. No. 207,196 and U. S. Pat. No. 2,227,714.

SUMMARY OF THE PRESENT INVENTION

The present invention enables a very lean air-fuel mixture to be utilized to operate an engine. This is accomplished by providing an auxiliary combustion chamber having a nozzle or passage through which an air-fuel mixture flows from a main combustion chamber during a compression stroke. An electrostatic field is established in the auxiliary combustion chamber to promote the flow of the air-fuel mixture into the auxiliary combustion chamber and the accumulation of a relatively rich air-fuel mixture adjacent to a spark plug. The spark plug has a main or central electrode which cooperates with a secondary or side electrode to establish a spark gap. A third or field electrode also cooperates with the central electrode of the spark plug. A high voltage source is utilized to establish a potential difference of a magnitude sufficient to cause a corona discharge between the main and field electrodes. The ions in this corona discharge become associated with the fuel particles in the air-fuel mixture in the auxiliary combustion chamber to cause the fuel particles to accumulate adjacent to the spark gap.

At the end of the compression stroke, a spark between the central electrode and the side electrode ignites the relatively rich air-fuel mixture in the auxiliary combustion chamber. The resulting flame is directed into the main chamber by a passage or nozzle extending between the main and auxiliary combustion chambers. Since this flame is of a relatively long duration and produces turbulence in the main combustion chamber, the lean air-fuel mixture in the main combustion chamber is substantially completely burned with relatively low main combustion chamber cylinder gas temperatures to thereby substantially reduce the amount of nitrous oxides formed in the main combustion chamber. The field electrode is advantageously made as a part of the spark plug to facilitate installation of the electrode. Spark plug life is lengthened due to cooling of the electrodes by the effect of the non-arcing ionic corona discharge from the central electrode.

Accordingly, it is an object of this invention to provide a new and improved engine having main and auxiliary combustion chambers and wherein fuel particles are accumulated adjacent to a spark gap in the auxiliary combustion chamber by an electrostatic field between a pair of electrodes which are spaced apart from the wall of the auxiliary combustion chamber.

Another object of this invention is to provide a new and improved engine having main and auxiliary combustion chambers and wherein an electrostatic field is formed in the auxiliary combustion chamber to accelerate the flow of a lean air-fuel mixture by establishing a corona discharge to ionize the air-fuel mixture which in turn works to promote the flow of a lean air-fuel mixture from the main chamber through a passage into the auxiliary chamber and thereby effect acceleraton in the rate of movement of the air-fuel mixture in the auxiliary combustion chamber.

BRIEF DESCRIPTION OF THE DRAWINGS

The foregoing and other objects and features of the present invention will become more apparent upon a consideration of the following description taken in connection with the accompanying drawings wherein:

FIG. 7 is an enlarged fragmentary sectional view of still another embodiment of the ignition unit;

FIG. 8 is a schematic illustration, similar to FIG. 1, illustrating a second embodiment of circuitry which is utilized in association with an ignition unit;

DESCRIPTION OF THE SPECIFIC PREFERRED EMBODIMENTS OF THE INVENTION

Figure 1:
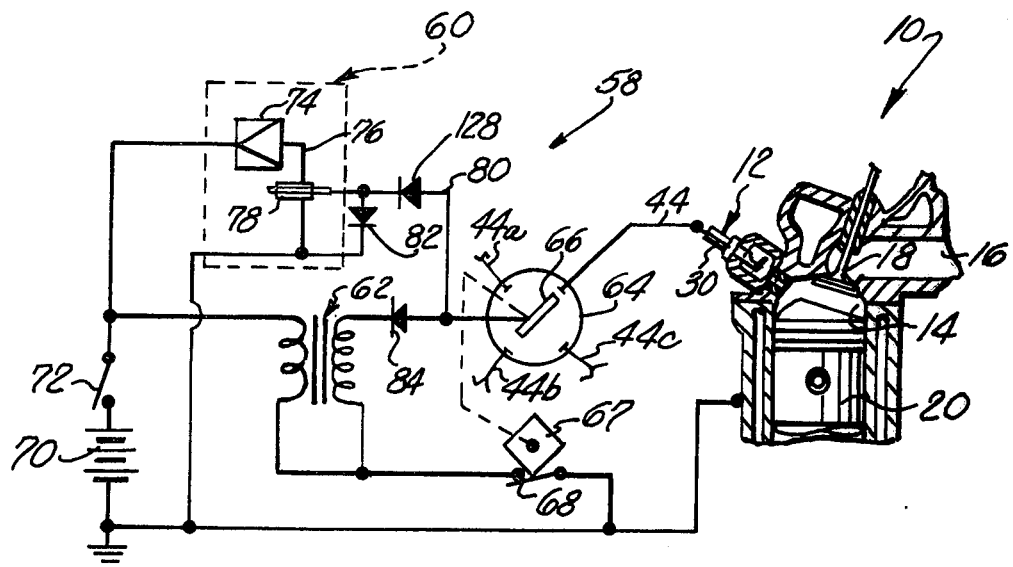
FIG. 1 is a schematic illustration of a portion of an engine constructed and operated in accordance with the present invention.

One cylinder of a four cylinder internal combustion engine 10 is illustrated in FIG. 1 and is provided with an ignition unit 12 constructed in accordance with the present invention. During an intake stroke of the engine 10, a relatively lean air-fuel mixture, that is a mixture having an air-to-fuel ratio which is substantially greater than the stoichiometric ratio, is transmitted to a main combustion chamber 14 (FIG. 2) through an intake manifold passage 16 and an intake valve 18. As a piston 20 subsequently moves upwardly through a compression stroke, the relatively lean air-fuel mixture is forced from the large main combustion chamber 14 through a passage or nozzle 24 into a relatively small auxiliary combustion chamber 26. A spark plug 30 has a main or central electrode 32 which cooperates with a secondary or side electrode 34 to define a spark gap 36 across which an electrical spark or arc is transmitted to effect ignition of the fuel in the auxiliary chamber 26 in a known manner at the end of a compression stroke of a piston 20.

In accordance with a feature of the present invention, a relatively rich air-fuel mixture is accumulated adjacent to the spark gap 36 by an electrostatic field established between the central electrode 32 and a field electrode 40. To this end, a large potential of a negative polarity is transmitted over a lead 44 to an outer end of the central electrode 32. This negative potential has a relatively large absolute value so that a corona discharge emanates from a pointed or needle shaped end portion 46 (see FIG. 3) of the central electrode 32. The flood of electrons in the corona discharge from the end portion 46 collect on the fuel particles in the air-fuel mixture entering the auxiliary chamber 26 through the open end of the passage 24. The charged fuel particles are attracted by the annular field electrode 40 which has a positive potential relative to the central electrode 34. This electrostatic attraction causes the air-fuel mixture to accelerate toward the earth potential portion radially from the central electrode 32 and the inner portion of the auxiliary combustion chamber 26.

The ionized fuel particles causes the air-fuel mixture to accelerate toward the field electrode 40 due to the effect of both the negative charge applied to the fuel particles by the electrons from the corona discharge and the fact that the fuel particles are of a high dielectric constant and are attracted to the zone of highest field intensity. The accelerating air-fuel mixture moves at a relatively high speed past the field electrode 40 and the fuel particles therein are subsequently electrostatically atomized and scattered outwardly of the electrode 32 against an inner surface 50 of the metallic wall 52 of the ignition unit 12. The metallic wall 52 of the ignition unit and the secondary electrode 34 are at the same potential as the field electrode 40. Therefore, the charged fuel particles accumulate on the wall 52 and the secondary electrode 34 to accumulate a relatively rich air-fuel mixture adjacent to the spark gap 36.

As the fuel particles are being attracted by the electrostatic field between the central electrode 32 and the field electrode 40, a violent flow of air is developed within the auxiliary combustion chamber 26. This promotes a flow of the air-fuel mixture from the main combustion chamber through the cylindrical passage 24 which has a relatively small diameter compared to the diameter of the auxiliary combustion chamber 26. It should be noted that the annular field electrode 40 and the central electrode 32 are disposed in a coaxial relationship with the passage 24 so that the electrostatic field formed between these electrodes promotes an inflow of the relatively lean air-fuel mixture from the main combustion chamber 14 in the manner illustrated schematically by arrows in FIG. 2. This spark plug enjoys the high potential electrostatic cooling effect as disclosed in the U.S. Pats. No. 3,629,584 and No. 3,670,606, although the plug seems to have rather complicated and disadvantageous configuration from the viewpoint of heat resistance, which brings the effect to make its life longer.

At the end of the upwardly directed compression stroke of the piston 20, an ignition circuit 58 (FIG. 1) causes an electrical arc to be transmitted between the main electrode 32 and the side electrode 34 to ignite the relatively rich air-fuel mixture in the spark gap 36. It should be noted that the potential difference between the main electrode 32 and the field electrode 40 is at all times insufficient to cause electrical arcing therebetween. Although the gap 36 is relatively small, the potential difference between the side electrode 34 and the central electrode 32 is insufficient to cause sparking across the gap when an electrostatic field is being established by the corona discharge from the end 46 of the central electrode 32 during the charging of the auxiliary combustion chamber 26 with the air-fuel mixture.

At the end of the compression stroke, the air-fuel mixture in the auxiliary chamber 26 is very rich and is electrostatically atomized and accelerated to a thoroughly mixed condition. Upon ignition of such relatively and generally rich air-fuel mixture in the auxiliary combustion chamber 26, the resultant flame is directed through the throat or nozzle passage 24 into the main combustion chamber 14. The turbulence created in the main combustion chamber 14 and the stable and comparatively longer duration of the flame projected from the nozzle or passage 24 into the main combustion chamber 14 insures that the relatively lean air-to-fuel mixture in the main combustion chamber 14 is fully ignited and completely burned as the piston 20 moves downwardly during the explosion stroke of the engine. The long duration of the flame projected from the nozzle 24 enables the gases in the main combustion chamber to burn at a temperature below the temperature at which nitrous oxides are formed. Of course, this complete burning of the relatively lean air-fuel mixture in the main combustion chamber 14 also tends to reduce fuel consumption and suppress the production of toxic exhaust gases. The production of hydrocarbons is reduced by the lean mixture in the main combustion chamber 14 and the long duration of the controlled flame propagation across the main combustion chamber.

The ignition circuit 58 (FIG. 1) includes a power source 60 which provides a relatively large negative polarity voltage. This voltage is utilized to establish the corona discharge from the end 46 of the central electrode 32. An ignition coil 62 is utilized to provide an even larger negative polarity voltage to cause an electrical spark between the main electrode 32 and the side electrode 34.

Figure 2:
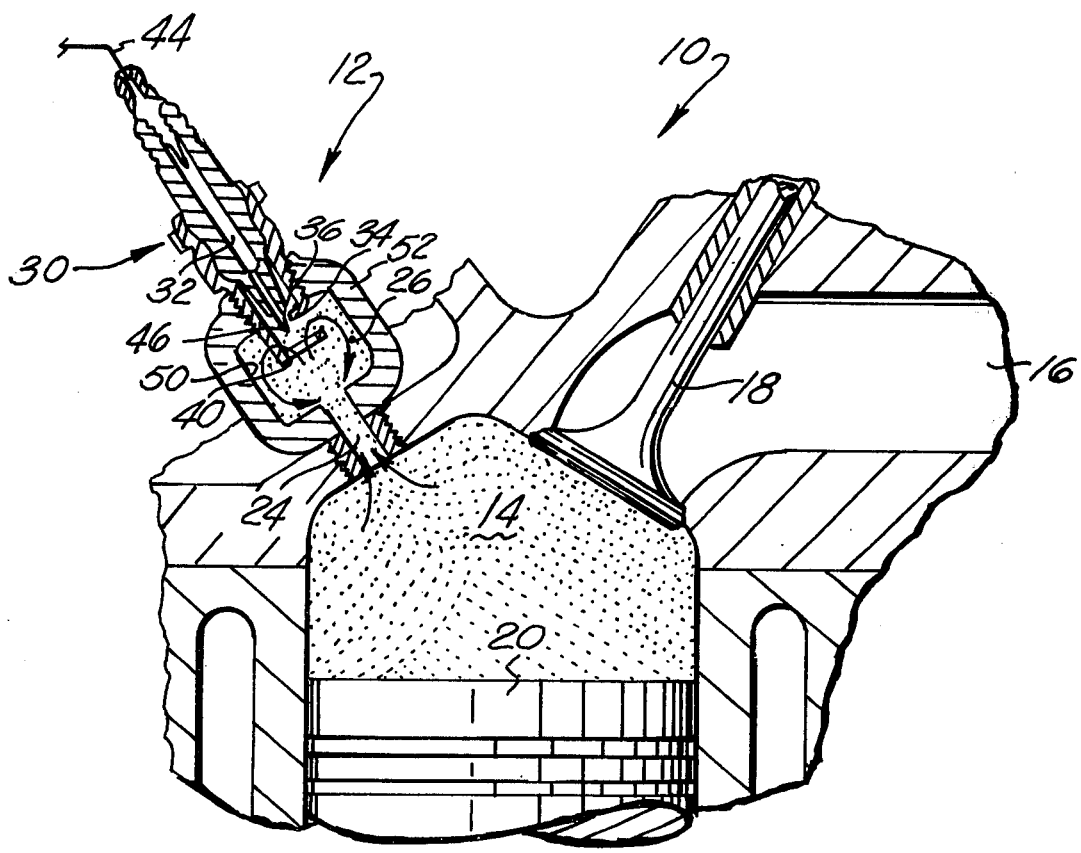
FIG. 2 is an enlarged sectional view of a portion of the engine of FIG. 1 and illustrating the relationship between one cylinder of the engine and an improved ignition unit.

A distributor 64 is connected with the coil 62 and includes a rotor 66 which cooperates with a plurality of leads, 44, 44a, 44b and 44c each of which is connected with an ignition unit associated with one of the four cylinders of the engine 10 in the manner illustrated in FIG. 2 for the ignition unit 12 and the lead 44. A distributor cam 67 opens and closes contacts 68 in timed relationship with movement of the rotor 66 and the various pistons 20 in the engine 10 to provide for sparking at the gaps between the central and side electrodes at the end of the compression strokes of the various pistons in a known manner.

The high voltage power source 60 and ignition coil 62 are energized by a battery 70 when an ignition switch 72 is closed. Upon closing of the ignition switch 72, an oscillator with a piezo-electric device 74 in the power source 60 supplies current through a lead 76 to one terminal of a piezo-electric transformer 78. A relatively high negative polarity voltage output from the piezo-electric transformer 78 (a usual winding type transformer is usable, if desired) is transmitted through a rectifier 128 and a lead 80 to the distributor 64. The second diode 128 is utilized to prevent any flow of positive polarity current from the power source 60 to the distributor 64. Any positive polarity output from the transformer 78 is transmitted to ground through a rectifier 82 and is prevented from being applied on the distributor 68. A reverse flow prevention rectifier 84 is provided between the rotor 66 of the distributor 64 and the coil 62 to prevent the relatively high negative polarity voltage from being transmitted from the rotor 66 to the secondary winding of the ignition coil 62.

Figure 4:
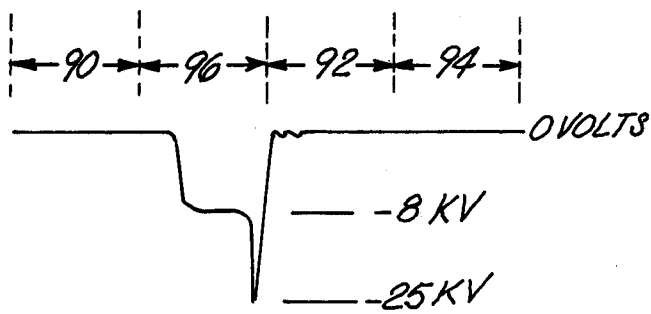
FIG. 4 is a schematic illustration depicting variations in the voltage applied to a central electrode of the ignition unit of FIG. 3 during an operating cycle of the engine.

The voltage applied to a lead 44 during an operating cycle of the engine 10 is illustrated schematically in FIG. 4. The distributor 64 opens the circuit connecting the lead 44 with the power source 60 and ignition coil 62 so that there is substantially no voltage applied to the central electrode 32 in the ignition unit 12 during an intake stroke indicated schematically at 90 in FIG. 4. Similarly, the central electrode 32 is deenergized during most of a subsequent power stroke and entire exhaust stroke indicated at 92 and 94 in FIG. 4.

During the initial portion of the compression stroke, indicated schematically at 96 in FIG. 4, the distributor 64 is effective to transmit a negative voltage from the power source 60 of a magnitude sufficient to cause a corona discharge from the end 46 of the central electrode 32. This voltage is insufficient to cause sparking between the central electrode 32 and the side electrode 34. In one specific preferred embodiment of the invention, a negative polarity voltage of 8kv was utilized to provide the corona discharge without sparking.

Toward the end of the compression stroke, the distributor cam 67 (FIG. 1) causes the contacts 68 to open in a known manner. A relatively large negative voltage is then transmitted through the rectifier 84 to the rotor 66 and the lead 44 to cause sparking across the gap 36 between the central electrode 32 and the side 34. In one specific preferred embodiment of the invention, a negative polarity voltage of 25kv was transmitted to the lead 44 to affect sparking at the gap 36. It should be understood that the foregoing values for the voltages utilized to establish the corona discharge and sparking are set forth herein for purposes of clarity of illustration and it is not intended that the invention be limited to these specific voltages since other voltages could be utilized if desired.

In the embodiment of the invention illustrated in FIGS. 1 through 4, a negative voltage was utilized to establish the corona discharge at the end of the central electrode 32 during the compression stroke. Although a positive voltage could be utilized to establish the corona discharge, a negative voltage is preferred since the emission of positive ions from the central electrode 32 would tend to suppress the electrostatic field and limit the ionization range of the air-fuel mixture to only the area immediately adjacent to the electrode. By utilizing a negative voltage to establish the corona discharge, a space charge density of the emitted electrons is relatively high and is effective to cause attachment of electrons to the air-fuel mixture in a relatively large area within the auxiliary chamber 26. In addition, the utilization of a negative voltage has been found to promote stability of sparking between the central and side electrodes 32 and 34.

The field electrode 40 is subjected to the intense heat and a corrosive environment during ignition of the air-fuel mixture in the auxiliary combustion chamber 26. However, the field electrode 40 and main electrode 32 have a relatively long service life due to the cooling effect of the corona discharge. However, after an extended period of use, the electrodes may have to be replaced. To facilitate replacement, all three electrodes 32, 34 and 40 are connected with a metallic body 100 of a spark plug 30. Of course, the central electrode 32 is electrically insulated from the metallic body 100 of the spark plug 30.

The metallic body 100 of the spark plug is threaded into an outer end portion 104 of the metal wall 52 so that the wall, side electrode 34 and field electrode 40 are maintained at the same electrical potential level. The annular field electrode 40 is supported in a coaxial relationship with the passage 24 and central electrode 32 by an outwardly projecting metallic leg section 106 which is integrally formed with the metallic body 100 of the spark plug. By positioning the field electrode outwardly from the inner end of the auxiliary chamber and toward the open end of the passage 24, the air-fuel mixture flow from the passage into the auxiliary chamber 26 is immediately subjected to the electrostatic field resulting from energization of the central electrode.

In the embodiment of the invention illustrated in FIGS. 1 through 4, the metallic wall 52 of the auxiliary combustion chamber 26 is unlined. In the embodiments of the invention illustrated in FIGS. 5 and 6, the walls of the auxiliary combustion chambers are at least partially lined with an electrically insulating and heat-resistive material. Since the embodiments of the invention illustrated in FIGS. 5 and 6 are generally similar to the embodiment illustrated in FIGS. 1 through 4, similar numerals will also be utilized to designate similar components, the suffix letter "a" being associated with the numerals in FIG. 5 and the suffix letter "b" being associated with the numerals in FIG. 6 to avoid confusion.

Figure 5:
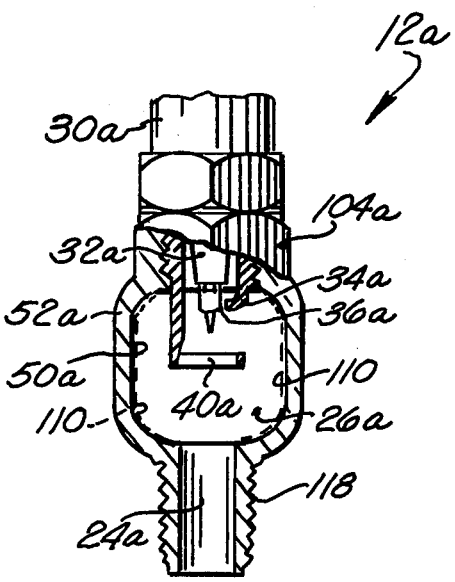
FIG. 5 is a fragmentary sectional view of a second embodiment of the ignition unit.

The ignition unit 12a of FIG. 5 includes an auxiliary chamber 26a formed by a circular metallic wall 52a having a threaded outer end portion 104a in which a spark plug 30a is received. The inside surface 50a of the metallic wall 52a is lined with a heat-resistive electrically insulating ceramic layer 110. During the operation of the ignition device 12a, the layer 110 becomes charged to the same polarity as the central electrode 32a so that fuel particles are repelled from the layer and attracted toward the annular field electrode 40a and the side electrode 34a. Of course, this promotes the accumulation of a rich air-fuel mixture adjacent to the spark gap 36a between the electrodes 32a and 34a.

Figure 6:
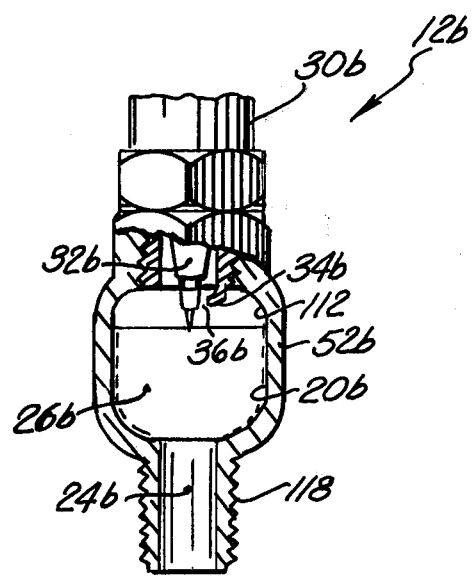
FIG. 6 is a sectional view of another embodiment of the ignition unit.

In the embodiment of the invention illustrated in FIG. 6, an electrically insulating ceramic layer 20b extends only part way up a metallic wall 52b of an ignition device 12b. The annular exposed surface 112 of the wall 52b upwardly from the electrically insulating coating 20b functions as the field electrode so that a separate field electrode, similar to the electrode 40, is not required. In this embodiment of the invention, electric field lines from the central electrode 32b act on the upper portion of the auxiliary combustion chamber 26b so that fuel particles are attracted toward the upper portion of the auxiliary combustion chamber adjacent to the side electrode 34b and the spark gap 36b between the side electrode and the main electrode 32b.

A third embodiment of the ignition device is illustrated in FIG. 7. Although this embodiment of the ignition device is generally similar to the embodiment illustrated in FIG. 3, it is believed that the embodiment of the ignition device illustrated in FIG. 7 has a construction which may be commercially preferable to the construction illustrated in FIG. 3. Since the components of the embodiment illustrated in FIG. 7 are generally the same as the components of the embodiment of the invention illustrated in FIG. 3, similar numerals will be utilized to designate similar components, the suffix letter "c" being associated with FIG. 7 to avoid confusion.

The ignition device includes a metallic wall 52c which defines an auxiliary combustion chamber 26c. Disposed within the auxiliary combustion chamber 26c is an annular field electrode 40c which surrounds a pointed end portion 46c of a central electrode 32c. A secondary or side electrode 34c is integrally formed with the metallic spark plug housing 100c. A passage or throat 24c is provided to conduct a relatively lean air-fuel mixture from a main combustion chamber to the auxiliary combustion chamber 26c. It should be noted that the pointed or needle shaped end portion 46c of the central electrode 32c extends into the ring formed by the annular field electrode 40c.

Figure 3:
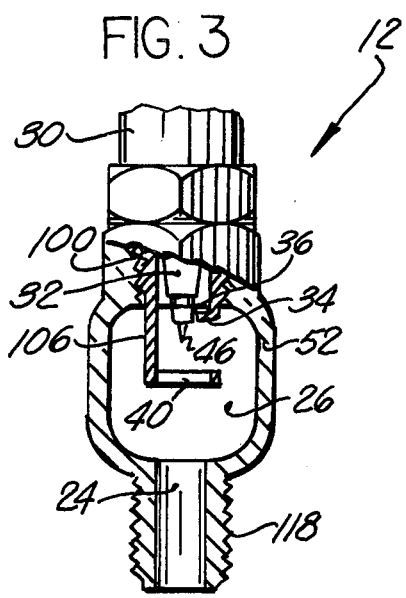
FIG. 3 is an enlarged fragmentary sectional view of the ignition unit of FIG. 2.

In the embodiments of the invention illustrated in FIGS. 3, 5, and 6, the ignition devices are provided with threaded end portions 118 which are adapted to be received within the threaded opening in the head of an engine block where a spark plug is normally inserted. The auxiliary combustion chamber 26 is separated from the water cooled head and block of the engine and may become rather hot. In the embodiment of the invention illustrated in FIG. 7, the auxiliary combustion chamber 26c of the ignition device 12c is adapted to be disposed in the head of the engine block. This enables the auxiliary combustion chamber 26 to be cooled by the fluid, whether air or water, utilized to cool the head of the engine. It should be understood that the housings of the ignition devices 12, 12a, 12b and 12c could be integrally formed with the cylinder head if desired.

In the embodiment of the ignition circuit 58 illustrated in FIG. 1, the corona discharge voltage is intermittently applied to the main or central electrode 32 through the distributor 64 in the manner illustrated schematically in FIG. 4. In the embodiment illustrated in FIG. 8, the ignition circuit continuously applies a corona discharge voltage to an ignition unit. Since the embodiment illustrated in FIG. 8 is generally similar to the embodiment of the invention illustrated in FIG. 1, similar components will be designated by similar numerals, the suffix letter "d" being associated with the numerals designating the components of FIG. 8 in order to avoid confusion.

The engine 10d is provided with an ignition device 12d of the same construction as illustrated in FIG. 7. The ignition device 12d is connected with a high-voltage power source 60d, an ignition coil 62d and a distributor 64d. The power source 60d includes an oscillator 74d with a piezo-electric device which is energized by a battery 70d when an ignition switch 72d is closed. A piezo-electric transformer 78d provides a relatively high voltage on a lead 80d. Any positive components of the voltage from the transformer 78d are transmitted back to ground through a rectifier 82d which is advantageously located outside the power source 60d. Since a voltage of a negative polarity and relatively high absolute magnitude is applied to the lead 80d by the power source 60d, the voltage passes through a diode 130 to the lead 44d connected with the ignition device 12d. It should be noted that this transmission of the voltage to the ignition device 12d is independent of the rotor 66d of the distributor 64d so that the voltage is continuously transmitted to the ignition device 12d.

When the rotor 66d is in the position shown in FIG. 8, and a piston 20d is at the end of a compression stroke, a distributor cam 67d opens contacts 68d to cause a negative sparking voltage to be transmitted from the rotor to the lead 44d. It should be noted that the sparking voltage is of a higher magnitude than the voltage supplied by the power sorce 60d. This large negative voltage is prevented from being transmitted to the power source 60d by the diode 130. A diode 84d is provided between the distributor rotor 66d and the ignition coil 62d to prevent the negative corona discharge voltage from being transmitted to the ignition coil. In the embodiments of the invention illustrated in FIGS. 1 and 8, the ignition circuits 58 and 58d are associated with four cylinder engines and the distributors 64 and 64d are provided with four separate leads to each of the cylinders. Of course, the ignition control circuits 58 and 58d could be associated with engines having any desired number of cylinders.

Figure 9:
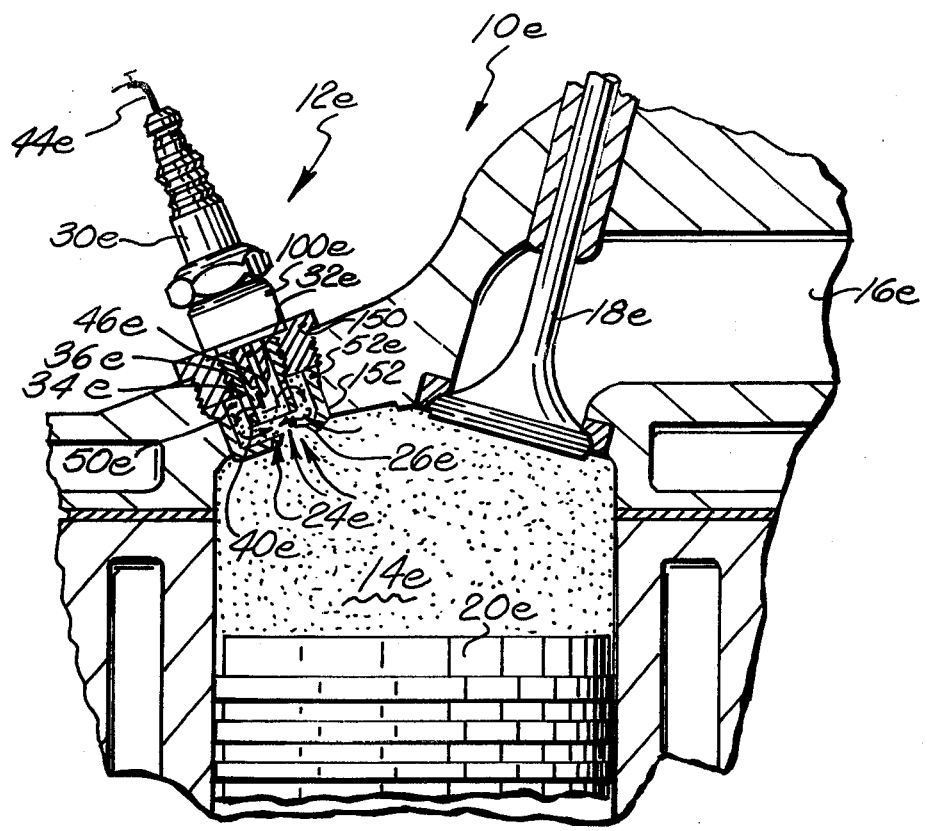
FIG. 9 is a sectional view illustrating the relationship between one cylinder of the engine and another embodiment of the ignition unit.

Another embodiment of the ignition device is illustrated in FIG. 9. Although this embodiment of the ignition device is generally similar to the embodiment illustrated in FIG. 3, it is believed that the embodiment of the ignition device illustrated in FIG. 9 has a construction which may be preferable with certain engines. Since the components of the embodiment illustrated in FIG. 9 are generally the same as the components of the embodiment of the invention illustrated in FIG. 3, similar numerals will be utilized to designate similar components, the suffix letter "e" being associated with FIG. 9 to avoid confusion.

The ignition device 12e includes a metallic wall 52e which defines an auxiliary combustion chamber 26e. Disposed within the auxiliary combustion chamber 26e is an annular field electrode 40e which surrounds a pointed end portion 46e of a central electrode 32e. A secondary or side electrode 34e is integrally formed with a metallic housing of a spark plug 30e. An annular field electrode 40e is also integrally formed with the metallic spark plug housing. A passage or throat 24e is provided to conduct a relatively lean air-fuel mixture from a main combustion chamber to the auxiliary combustion chamber 26e.

In the embodiments of the invention illustrated in FIGS. 3, 5 and 6, the ignition devices have auxiliary chambers which are spaced apart from the cylinder heads of the engine and have passages or throats which are coaxial with the central electrodes. In the embodiment of the invention illustrated in FIG. 9, the auxiliary chamber 26e is disposed in the cylinder head where it can be cooled by the water utilized to cool the cylinder head.

Another advantage of the ignition device 12e is that the opening 24e is offset from the axis of the central electrode 32e in a direction toward an intake valve 18e. This reduces the distance which the fuel air particles travel from the intake valve to the auxiliary chamber. In addition, the offset throat 24e is effective to direct the flame from the auxiliary chamber 26e toward the relatively cool air-fuel mixture adjacent to the intake valve.

To enable the throat 24e to be properly located so as to direct the flame from the auxiliary combustion chamber 26e toward the intake valve 18e, the metallic wall 52e of the auxiliary combustion chamber 26e is formed by two separate parts; that is, an annular internally and externally threaded ring 150 and a generally cup-shaped inner wall 152. The cylindrical side of the inner wall 152 is positioned to locate the opening 24e in the desired angular relationship with the valve 18e. The inner wall is then press-fitted into an opening in the cylinder head to thereby hold the opening in the desired position. The ring 150 and plug 30e are then installed in the cylinder block.

Figure 10:
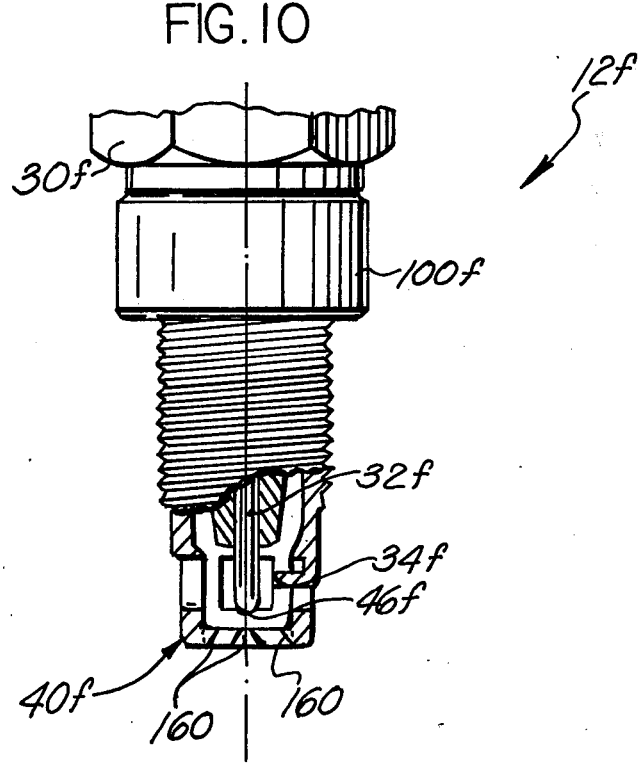
FIG. 10 is an enlarged fragmentary sectional view of another embodiment of the ignition unit.

Still another embodiment of the ignition device is illustrated in FIG. 10. Although this embodiment of the ignition device is generally similar to the embodiment illustrated in FIG. 3, it is believed that the embodiment of the ignition device illustrated in FIG. 10 has a construction which may be preferable in certain environments. Since the components of the embodiment illustrated in FIG. 10 are generally the same as the components of the embodiment of the invention illustrated in FIG. 3, similar numerals will be utilized to designate similar components, the suffix letter "f" being associated with FIG. 10 to avoid confusion.

The ignition device 12f includes a metallic wall (not shown) which defines an auxiliary combustion chamber. Disposed within the auxiliary combustion chamber is an annular field electrode 40f which surrounds a rounded end portion 46f of a central electrode 32f. A secondary or side electrode 34f is integrally formed with a metallic housing 100f of a spark plug 30f. An annular field electrode 40f is also integrally formed with the metallic spark plug housing 100f.

In the embodiments of the invention illustrated in FIGS. 3, 5 and 6, the ignition devices are provided with pointed central electrodes which are coaxial with relatively broad cylindrical surfaces of the field electrode. In the embodiment of the invention illustrated in FIG. 10, the field electrode 40f has a plurality of radially inwardly extending projections which cooperate with the rounded end 46f of the central electrode 32f. Due to the pointed configuration of the projections 160 and the rounded configuration of the end of the central electrode 32f, a relatively large number of positrons are discharged from the projection 160 while a relatively small number of electrons are discharged from the negatively charged central electrode 32f. The positrons are of a much larger size than the electrons. This enables the positrons to more easily ionize the air-fuel mixture entering the auxiliary combustion chamber.

In an actual test of the invention, we installed an ignition device similar to the embodiment of the invention shown in FIG. 7 on the world-famous Honda CVCC 1,500 cc engine. This engine has an auxiliary combustion chamber and is highly appreciated in an anti-pollution engine for actual use without any thermal reactor, catalytic converter and EGR. As a matter of course, we removed a cam-drive system for the third valve which supplies rich gas to the auxiliary combustion chamber and the carburetor for the rich gas. The ignition device was installed in the side of the auxiliary combustion chamber.

Although no other mechanical or electrical adjustment was made for the tests, the results of the first test in which a 5,000V power source used with a piezo-electric transformer proved that the Japanese 1976 regulation standards based on the E.P.A. 11 test mode was cleared regarding production of $NO_x$, CO, and HC. In the E.P.A. 10 test mode test, HC was measured more than the standards, which was interpreted that there were some misfires during the idling of the engine.

At the second test in which an 8,000V power source was used with a usual winding-type transformer, the results proved that the Japanese 1982 regulation standards was satisfactorily cleared both in the tests of E.P.A. 10 and 11 modes. At this test, the high power was supplied continuously, and the changes of the potentials were similar to that shown in FIG. 4. The current supplied for the purpose was about 18 to 20 micramp.

In view of the foregoing remarks, it can be seen that the present invention enables a very lean air-fuel mixture to be utilized to operate an engine 10. This is accomplished by providing an auxiliary combustion chamber 26 having a nozzle or passage 24 through which the lean air-fuel mixture flows from a main combustion chamber 14 during a compression stroke. An electrostatic field is established in the auxiliary combustion chamber 26 to promote the flow of the air-fuel mixture into the auxiliary combustion chamber and the accumulation of a relatively rich air-fuel mixture adjacent to a spark plug 30. The spark plug 30 has a main or central electrode 32 which cooperates with a secondary or side electrode 34 to establish a spark gap 36. A third or field electrode 40 also cooperates with the central electrode 32 of the spark plug. A high-voltage source 60 is utilized to establish a potential difference of a magnitude sufficient to cause a corona discharge between the main and field electrodes. The ions in this corona discharge become associated with the fuel particles in the air-fuel mixture in the auxiliary combustion chamber 26 to cause the fuel particles to accumulate adjacent to the spark gap 36.

At the end of the compression stroke, a spark between the central electrode 32 and the side electrode 34 ignites the relatively rich air-fuel mixture in the auxiliary combustion chamber 26. The resulting flame is directed into the main chamber by a passage or nozzle 24 extending between the main chamber by a passage or nozzle 24 extending between the main and auxiliary combustion chambers. Since the flame is of a relatively long duration and produces turbulence in the main combustion chamber 14, the lean air fuel-mixture in the main combustion chamber is completely burned.

The embodiments of the invention in which an exclusive property or privilege is claimed are defined as follows:

1. An engine comprising wall means for at least partially defining a main combustion chamber for receiving a relatively leans air-fuel mixture and an auxiliary combustion chamber which is connected in fluid communication with said main combustion chamber, said wall means including means for defining an opening through which the lean air-fuel mixture from said main combustion chamber can flow into said auxiliary combustion chamber, a spark plug connected with said wall means for igniting an air-fuel mixture in said auxiliary combustion chamber during operation of the engine, said spark plug including first and second electrodes exposed to the interior of said auxiliary combustion chamber and at least partially defining a path along which an electric arc passes to ignite an air-fuel mixture in said auxiliary combustion chamber, and means for establishing a corona discharge in said auxiliary combustion chamber to promote the accumulation of a relatively rich air-fuel mixture adjacent to said first and second electrodes, said means for establishing a corona discharge including a third electrode spaced apart from and disposed within said auxiliary combustion chamber and means for establishing between said first and third electrodes an electrical potential sufficient to cause a corona discharge.

2. An apparatus as set forth in claim 1 wherein said first electrode has a longitudinally extending central axis, said third electrode being disposed in a coaxial relationship with said first electrode and having a generally annular cross sectional configuration in a plane extending transversely to the central axis of said first electrode.

3. An apparatus as set forth in claim 1 wherein said wall means includes surface means for defining a passage extending between said main and auxiliary combustion chambers and having a substantially smaller cross sectional area than the cross sectional area of said auxiliary combustion chamber.

4. An apparatus as set forth in claim 1 wherein said spark plug includes a metallic outer wall which engages said wall means, at least a portion of said third electrode being integrally formed with the outer wall of said spark plug.

5. An apparatus as set forth in claim 1 wherein an outer end portion of said third electrode is disposed closer to said opening than an outer portion of said first electrode.

6. An engine comprising wall means for at least partially defining a main combustion chamber for receiving an air-fuel mixture, an auxiliary combustion chamber having a sidewall surface with a first cross sectional area, and a passage extending between said main and auxiliary combustion chambers to enable an air-fuel mixture to flow from said main combustion chamber to said auxiliary combustion chamber, said passage having a second cross sectional area which is less than said first cross sectional area to direct a flame from said auxiliary combustion chamber to said main combustion chamber upon ignition of an air-fuel mixture in said auxiliary combustion chamber, means exposed to the interior of said auxiliary combustion chamber for igniting an air-fuel mixture in said auxiliary combustion chamber, and means for promoting a flow of the air-fuel mixture from said main combustion chamber through said passage into said auxiliary chamber and for promoting a flow of the air-fuel mixture within the auxiliary combustion chamber, said means for promoting a flow of the air-fuel mixture including a field electrode disposed in said auxiliary combustion chamber and spaced apart from the sidewall surface of said auxiliary combustion chamber, said field electrode having an inner surface defining an opening and an outer surface directly exposed to and spaced apart from the sidewall surface of said auxiliary combustion chamber, a main electrode having an outer end portion disposed in alignment with the opening in said field electrode, and means for promoting a flow of an air-fuel mixture along a flow path which extends from said passage through the opening in said field electrode and diverges outwardly in a plurality of directions at an area between said main and field electrodes to an area between the outer surface of said field electrode and the sidewall surface of said auxiliary combustion chamber, said means for promoting a flow of the air-fuel mixture including means for establishing between said main and field electrodes an electricl potential of a magnitude sufficient to cause ionization of the air-fuel mixture as it moves along the flow path to effect acceleration of the air-fuel mixture in said auxiliary combustion chamber toward said field electrode, a dispersing of the air-fuel mixture in the area between said main and field electrodes and movement of the dispersed air-fuel mixture into the space between the outer surface of said field electrode and the sidewall surface of said auxiliary combustion chamber.

7. An apparatus as set forth in claim 6 wherein the open end of said passage has a circular cross sectional configuration, said main electrode having a longitudinally extending central axis which is disposed in a coaxial relationship with said open end of said passage, said field electrode having a circular cross sectional configuration and disposed in a coaxial relationship with and spaced apart from said main electrode and said open end of said passage.

8. An apparatus as set forth in claim 6 wherein said means for igniting an air-fuel mixture in said auxiliary combustion chamber includes an element which is maintined at substantially the same electrical potential level as the field electrode to promote the accumulation of fuel adjacent to said means for igniting an air-fuel mixture.

9. An apparatus as set forth in claim 6 wherein said main electrode has a pointed end portion and the field electrode has an annular configuration with a central axis which extends through said main electrode.

10. An apparatus as set forth in claim 6 wherein said means for establishing an electrical potential between said electrodes includes means for maintaining the electrical potential during a complete operating cycle of the engine.

11. An apparatus as set forth in claim 6 wherein said main electrode has a rounded end portion and the field electrode has a plurality of pointed end portions.

12. An apparatus as set forth in claim 18 wherein said passage has a central axis which is offset from central axis of said opening in said field electrode.

13. An engine as set forth in claim 6 further including surface means for defining a plurality of openings through which the diverging air-fuel mixture flow passes in flowing from the area between said field and main electrodes to the area between the outer surface of the field electrode and the sidewall of said auxiliary combustion chamber.

14. An engine as set forth in claim 6 wherein means for establishing an electrical potential between said main and field electrodes includes means for establishing an electrical potential of a magnitude sufficient to cause a corona discharge from said main electrode.

15. An apparatus as set forth in claim 14 wherein said means for establishing an electrical potential of a magnitude sufficient to cause a corona discharge from said main electrode includes means for establishing a charge of a negative polarity on said main electrode.

16. An apparatus as set forth in claim 15 wherein said means for igniting an air-fuel mixture in said auxiliary combustion chamber includes a third electrode which cooperates with said main electrode to define a spark gap, said means for establishing an electrical potential of a magnitude sufficient to cause a corona discharge being ineffective to establish an electrical potential between said main electrode an said third electrode of a magnitude sufficient to cause electrical arcing across said spark gap.

17. An apparatus as set forth in claim 16 wherein said means for igniting an air-fuel mixture in said auxiliary combustion chamber includes means for increasing the absolute magnitude of the charge of a negative polarity on said main electrode to a value sufficient to cause electrical arcing between said main electrode and said third electrode at a predetermined time in an operating cycle of the engine.

* * * * *

UNITED STATES PATENT AND TRADEMARK OFFICE
CERTIFICATE OF CORRECTION

PATENT NO. : 4,041,922
DATED : August 16, 1977
INVENTOR(S) : Michio Abe et al

It is certified that error appears in the above-identified patent and that said Letters Patent are hereby corrected as shown below:

Column 11, line 3, change "leans" to --lean--.

Column 11, line 41, change "the" to --said--.

Column 12, line 54, change "18" to --6--.

Signed and Sealed this

Twentieth Day of December 1977

[SEAL]

Attest:

RUTH C. MASON
Attesting Officer

LUTRELLE F. PARKER
Acting Commissioner of Patents and Trademarks